Patented Jan. 3, 1950

2,493,007

UNITED STATES PATENT OFFICE 2,493,007

FLUORINATION OF UNSATURATED HALO-CARBONS WITH CERIUM TETRAFLUO-RIDE

Earl T. McBee, La Fayette, Ind., Richard M. Robb, Wilmington, Del., and Waldo B. Ligett, Detroit, Mich., assignors to Purdue Research Foundation, La Fayette, Ind., a corporation of Indiana No Drawing. Application March 4, 1946, Serial No. 651,988

4 Claims. (Cl. 260—648)

This invention relates to organic compounds containing fluorine, particularly to saturated fluorine-containing halocarbons, and to a method for the preparation thereof. This application is a continuation in part of application Serial No. 596,967, filed May 31, 1945.

The preparation of fluorine-containing organic compounds, such as saturated fluorine-containing halocarbons, has, in most instances, heretofore been attended with considerable difficulty. It is well known that elemental fluorine generally may not be reacted with organic compounds and the reaction controlled so as to produce a desired fluorine-containing compound. Although certain halogens, other than fluorine, e. g., chlorine and bromine, may react with a wide variety of organic compounds under suitable conditions to give high yields of valuable products, the reaction of fluorine with most organic compounds, including unsaturated halocarbons, is violent in nature and is usually accompanied by profound decomposition of the organic compound. In most cases, reaction occurs with explosive violence in spite of extreme measures which may be taken to moderate its effect. In many instances, the reaction products consist mainly of carbonaceous matter or of other equally undesirable products. When using a large excess of fluorine, the principal product is generally carbon tetrafluoride.

Many attempts have been made to use fluorinating agents other than elemental fluorine to replace hydrogen or halogen in organic compounds to obtain desired fluorine-containing compounds, e. g., saturated fluorine-containing halocarbons. Among the fluorinating agents which have been tried may be mentioned hydrogen fluoride, antimony trifluoride, mercuric fluoride, iodine pentafluoride, bromine trifluoride, chlorine trifluoride, and many others. Although certain of these agents may, under certain conditions, replace with fluorine an existing halogen atom other than fluorine already in the organic molecule, little success has been reported in attempting to replace hydrogen with fluorine using these agents. For this reason it is usually necessary as a step preliminary to the preparation of a desired saturated fluorine-containing halocarbon to prepare the corresponding chlorine-, bromine- or iodine-containing compound. This renders processes using these fluorinating agents unduly complicated and, also, the requisite chlorine-, bromine- or iodine-containing compound may not always be prepared readily. Furthermore, highly fluorinated compounds, e. g., perfluorinated compounds, are not usually obtained readily from the corresponding highly chlorinated, brominated or iodinated compounds using such agents. Certain of the agents referred to, e. g., the halogen fluorides, react with many organic compounds with explosive violence.

Most metal fluorides heretofore proposed as agents to replace chlorine, bromine or iodine in organic compounds with fluorine tend, under the conditions necessary to a high degree of exchange of halogen, to produce polymerized or unsaturated break-down products. For these and other reasons fluorine-containing saturated halocarbons have not heretofore been available except in a few instances, and industry has been deprived of many members of this valuable group of compounds. The need for new and improved procedures for the preparation of fluorine-containing saturated halocarbons is evident.

It is, therefore, an object of the present invention to provide a method for the preparation of a saturated fluorine-containing halocarbon.

A further object is to provide a novel fluorinating agent capable of converting an unsaturated halocarbon into a saturated fluorine-containing halocarbon.

An additional object is to provide a method whereby a fluorine-containing saturated halocarbon may be prepared from an unsaturated halocarbon containing two or more different halogens.

An additional object is to provide a method for preparing a fluorine-containing saturated halocarbon whereby the formation of undesirable decomposition or polymerization products is substantially avoided.

An additional object is to provide a method for fluorinating an unsaturated halocarbon whereby a predetermined degree of fluorination, including perfluorination, may be effected readily.

An additional object is to provide a fluorination method which is not subject to certain of the disadvantages set forth above.

Still an additional object is to provide certain new and novel fluorine-containing saturated halocarbons, including fluorocarbons, and other highly fluorinated products.

Other objects will become apparent from the following specification and claims.

According to the present invention the foregoing and related objects are accomplished readily and economically by contacting an unsaturated halocarbon with cerium tetrafluoride under suitable reaction conditions until a desired degree of fluorination is effected. Cerium tetrafluoride has been found to be an excellent fluorinating agent for unsaturated halocarbons, and, when the fluorination reaction is carried out under conditions hereinafter described, the reaction can be controlled without difficulty. Substantially any desired proportion of the maximum theoretical amount of fluorine can be introduced into an unsaturated halocarbon molecule with the formation of little or no decomposition or polymerization products. Unsaturated aliphatic, aromatic, and alicyclic halocarbons, including fused-ring unsaturated halocarbons and polycarbocyclic non-fused-ring unsaturated halocarbons, can be converted readily to saturated fluorine-containing halocarbons.

Unsaturated halocarbons, such as tetrachloroethylene, tetrabromoethylene, dichlorodibromoethylene, difluorodichloroethylene, decachlorocyclohexene, octachlorobutylene, hexachlorobenzene, octachlorotoluene, decachlorobiphenyl, pentachlorobenzotrifluoride, and tetrabromohexachloronaphthalene, can be fluorinated readily, usually first with addition of fluorine atoms at the points of unsaturation and, if desired, with the replacement of halogen other than fluorine in the molecule, and the production of saturated flourine-containing halocarbons.

Examples of halocarbons containing at least one halogen other than flourine which can be prepared by the method of the invention include tetrachlorodifluoroethane dichlorotetrafluoroethane, monobromomonochlorotetrafluoroethane, monobromopentafluoroethane, dichlorodecafluorocyclohexane, dichlorotetradecafluoroheptane, pentafluoromonoiodoethane, tetrachlorooctafluorocyclohexane, and many others.

According to one modification of the present invention, perfluorination may be accomplished and perfluoro compounds may be obtained by contacting an unsaturated halocarbon with cerium tetrafluoride as an active fluorinating agent under such conditions and for such time that all halogen other than fluorine in the molecule is replaced by fluorine. In most instances, unsaturated carbon-carbon bonds in the molecule are saturated by the addition of fluorine during such perfluorination. Examples of such perfluoro compounds are hexafluoroethane, dodecafluoropentane, dodecafluorocyclohexane, perfluoromethylcyclohexane, perfluorobicyclohexyl, perfluoronaphthalane, and the like.

In certain instances, rupture of the molecule may be effected with the formation of saturated fluorine-containing halocarbons having fewer carbon atoms in the molecule than does the original halocarbon fluorinated. This is herein referred to as fluorinolysis. Thus, for example, high molecular weight unsaturated halocarbons may be converted largely to high molecular weight fluorine-containing saturated halocarbons, to high molecular weight saturated fluorocarbons, i. e., to saturated compounds containing only carbon and fluorine, or, under more vigorous conditions to compounds having fewer carbon atoms in the molecule, such as hexafluoroethane and even carbon tetrafluoride, if desired.

Althought the fluorination reaction is exothermic, it proceeds without explosive violence and may be controlled readily so as to produce a product containing substantially any desired proportion of the theoretical amount of fluorine. The fluorination reaction is carried out at a temperature between about 50° C., or somewhat lower, and about 600° C., or somewhat higher, preferably between about 100° C. and about 550° C. Generally speaking, the addition of fluorine to a carbon-carbon unsaturated bond using cerium tetrafluoride as the active fluorinating agent occurs at a somewhat lower temperature than does the replacement with fluorine of a hydrogen or halogen other than fluorine. This, however, is not always the case. It has also been observed that the optimum temperature for the introduction of a fluorine atom into an organic molecule increases somewhat as the number of fluorine atoms in the organic molecule is increased. It follows that the actual fluorination temperature employed will depend to some extent upon the organic compound fluorinated and the degree of fluorination desired.

During the course of the reaction, the cerium tetrafluoride used as a fluorinating agent is converted to cerium trifluoride from which cerium tetrafluoride may be regenerated readily by exposing the trifluoride to elemental fluorine at an elevated temperature. The reaction may thus be carried out in cyclical manner, the cerium tetrafluoride being first contacted with an unsaturated halocarbon to produce a desired fluorine-containing saturated halocarbon and the spent cerium tetrafluoride, consisting largely of cerium trifluoride, then regenerated with elemental fluorine and the cycle repeated. Furthermore, it may be desirable in some instances when a highly fluorinated product is desired, to effect only partial fluorination in the first passage of the unsaturated halocarbon through the fluorination reactor and then to recycle the fluorine-containing product over fresh or regenerated cerium tetrafluoride to increase the proportion of fluorine in the organic molecule. Recycling of the fluorine-containing product and of the cerium fluoride may, if desired, be continued until perfluorination is effected, the final product being substantially free of unsaturated carbon-carbon linkages and of chlorine, bromine and iodine.

Cerium tetrafluoride is a solid which is unstable in the presence of water or atmospheric moisture. The compound is substantially stable, when dry, at temperatures as high as 500° C. and higher. Cerium tetrafluoride may be prepared readily in a number of ways, one convenient way being by the treatment of anhydrous cerium trifluoride with elemental fluorine at an elevated temperature, e. g., at a temperature above about 200° C., preferably at a temperature between about 400° C. and about 500° C. Cerium trifluoride may be prepared readily by treating anhydrous cerium trichloride with anhydrous hydrogen fluoride at temperatures above about 200° C., by precipitation from a solution of a soluble cerium salt, e. g., cerous nitrate, with hydrogen fluoride or a soluble metal fluoride, filtering and drying, and in many other ways.

In practicing the invention it has been found convenient to place anhydrous cerium trichloride in the reaction vessel in which the subsequent fluorination of an unsaturated halocarbon is to be carried out, and then to treat the cerium trichloride in the vessel first with hydrogen fluoride and then with elemental fluorine, or with elemental fluorine alone, under the said requisite conditions of temperature. Following the fluorination of an unsaturated halocarbon the spent cerium fluoride, which contains a large proportion of cerium trifluoride, may be regenerated and the trifluoride reconverted to the tetrafluoride by contacting it with elemental fluorine at an elevated temperature. In this way the process may be carried out in cyclic manner, the cerium fluorides being treated alternately with an unsaturated halocarbon and with elemental fluorine. Thus the consumption of cerium salts in the process is reduced to a minimum and consists only of such negligible quantities as may be lost mechanically during the process.

Fluorination of an unsaturated halocarbon with cerium tetrafluoride may be carried out in any convenient manner and in any convenient type of apparatus. It has been found satisfactory to dispose the cerium tetrafluoride in a thin layer, e. g., in a layer from about one-half to about one inch thick, on shelves or trays within the reaction vessel or directly on the floor of the vessel itself and to pass an unsaturated halocarbon in vapor form through the vessel. The process is frequently carried out by distributing a shallow layer of cerium tetrafluoride throughout the length of a metal tube and passing an unsaturated halocarbon in vapor form through the tube. If desired, tubes with rectangular cross section may be used and the exposed surface of the layer of cerium tetrafluoride thus increased. The mass may be agitated, if desired. The physical form of the cerium tetrafluoride is preferably such that easy penetration of the mass of tetrafluoride by gases or vapors passing through the reaction vessel is facilitated. Granulated or coarsely powdered cerium tetrafluoride has been found to be satisfactory.

The reaction vessel, which may be of iron, nickel or other material resistant to the reactants and reaction products under the conditions of fluorination and regeneration, is maintained at a desired reaction temperature by any convenient means. Heating may be effected in any one of a number of ways, such as by electrical resistance heaters, by gas flames, or by immersing the reaction vessel in a suitable high-boiling liquid, such as a low-melting alloy. The fluorination reaction is exothermic in nature and in large size reaction vessels heating may not be necessary after the reaction has started. In some instances cooling may even be advisable.

Fluorination of an unsaturated halocarbon with cerium tetrafluoride may be carried out with the unsaturated halocarbon in either liquid or gaseous phase. In practice, however, it has usually been found more convenient, especially when high temperatures are required, to pass the unsaturated halocarbon through the reactor in vapor form. In this way the handling of organic liquids at high temperatures is avoided and the reaction may be carried out at ordinary pressures. The unsaturated halocarbon may be introduced into the reaction vessel either in the form of its vapor or as a liquid. In the latter instance the unsaturated halocarbon is usually vaporized in the portion of the reaction vessel nearest the entry port and the vapors are then fluorinated as they pass through the remaining part of the vessel.

In certain instances, the halocarbon reactant may be heated in a vessel separate from the fluorination vessel, a stream of inert gas, such as nitrogen, hydrogen fluoride, or helium, passed through the heated liquid, and the mixed vapors of inert gas and of halocarbon reactant then passed into the fluorination vessel. Fluorination with the halocarbon reactant in the vapor phase is conveniently carried out at atmospheric pressure although it may, if desired, be carried out at a pressure higher or lower than atmospheric pressure.

Although fluorination of an unsaturated halocarbon in the vapor phase using cerium tetrafluoride as the active fluorinating agent is usually carried out at a temperature between about 50° C. and about 600° C., it may be carried out at any convenient temperature above the condensing temperature of the vapors at the reaction pressure. In certain instances, the temperature of fluorination may even be maintained sufficiently high to cause fluorinolysis. Temperatures sufficiently high to cause the formation of substantial amounts of undesirable by-products are to be avoided.

After the cerium tetrafluoride has been largely exhausted and converted substantially to cerium trifluoride, the reaction vessel may be purged with nitrogen or other inert gas to free it from most of the organic substances before elemental fluorine is admitted to the reaction vessel to regenerate cerium tetrafluoride. In this way, the possible explosive reaction of residual organic vapor with elemental fluorine within the reaction vessel is avoided. Regeneration of the spent cerium fluoride is, as noted above, carried out at a temperature above about 200° C., preferably at a temperature between about 400° C. and about 500° C.

As mentioned previously, the process of the invention may, if desired, be carried out with the unsaturated halocarbon reactant in the liquid phase in which case the halocarbon and cerium tetrafluoride may be mixed together in any convenient way, e. g., the halocarbon may be stirred in a vessel at the desired temperature and cerium tetrafluoride added gradually thereto. Such procedure with the halocarbon reactant in the liquid phase is of particular value when the halocarbon reactant boils at a high temperature. It has been found that the ratio of the amount of cerium tetrafluoride to the amount of halocarbon reactant necessary when a high degree of fluorination is to be effected is so great that when the reaction is carried out with the halocarbon reactant in liquid phase the final reaction mixture is frequently of a moist granular nature rather than of a fluid nature and is difficult to handle on a large scale. This difficulty may be overcome in a number of ways. Thus the liquid which is to be fluorinated may be diluted with a liquid inert under the reaction conditions, such as a high boiling fluorocarbon, to increase the proportion of liquid in the reaction mixture.

Alternatively, fluorination in the liquid phase may be carried out step-wise. Thus in the first step the addition of solid cerium tetrafluoride to the liquid halocarbon reactant may be stopped while the mixture is still fluid enough to be agitated readily. The reaction product may be filtered or otherwise treated to separate the organic and inorganic portions thereof, the spent cerium fluoride regenerated with fluorine, and the partially fluorinated organic portion then fluorinated further by adding to it fresh or regenerated cerium tetrafluoride. Although the invention is not limited to vapor phase procedures, it is readily apparent that in many instances the fluorination reaction is more conveniently carried out in vapor phase.

The degree of fluorination effected is dependent, among other factors, upon the reaction temperature and the time of contact of the halocarbon reactant with cerium tetrafluoride. In order to effect a high degree of fluorination of an unsaturated halocarbon in the vapor phase during a single pass through the reaction vessel, it may be necessary to pass the reactant vapor very slowly through the vessel thus limiting the rate at which a highly fluorinated product may be produced in any particular reaction vessel. It has also been found that many unsaturated halocarbons are somewhat more thermally unstable in the unfluorinated or only lowly fluorinated state than when they are more highly fluorinated and that, when it is attempted to fluorinate such unfluorinated or lowly fluorinated substances to produce a highly fluorinated substance during a single pass of the vapor through the fluorination vessel, it may be necessary to elevate the temperature to such a degree that undesirable decomposition of the halocarbon reactant may occur before substantial fluorination is effected.

For these and other reasons it is sometimes convenient and desirable to recycle the halocarbon reactant after it has been partially fluorinated, usually after the spent cerium fluoride has been regenerated to insure there being a high proportion of cerium tetrafluoride in the cerium fluoride mass. This recycling of the halocarbon product may be repeated as many times as is desirable or necessary to introduce the desired proportion of fluorine into the molecule and each recycling is preferably, but not necessarily, carried out at a temperature higher than the preceding one. In this way the first stages of fluorination, which do not require high temperatures and during which relatively unstable organic compounds may be present in the fluorination vessel, are carried out at a relatively low temperature while later stages of fluorination, which usually require a higher temperature and during which only relatively stable fluorine-containing substances are present in the fluorination vessel, are carried out at a higher temperature. The same effect may be obtained by passing the unsaturated halocarbon reactant thru a number of reaction vessels in series each containing cerium tetrafluoride and each maintained at a reaction temperature which may, if desired, be higher than that of the preceding vessel. By a suitable arrangement of a number of reaction vessels in series the process may be carried out continuously, it being only necessary to by-pass the vapors of the halocarbon reactant around any one of the reaction vessels while the spent cerium fluoride therein is being regenerated with fluorine.

It is to be noted that when the fluorination involves the replacement of a chlorine, a bromine or an iodine atom with a fluorine atom, replaced halogen appears in the reaction product in elemental form. When, however, the only reaction involved is the addition of fluorine to an unsaturated carbon-carbon bond, elemental halogen does not appear in the reaction product. The effluent vapors from the reaction may thus, depending upon the substance fluorinated, contain, in addition to the desired saturated fluorine-containing halocarbon, a halogen other than fluorine together with unfluorinated or partially fluorinated halocarbon reactant. In most instances replacement of a chlorine, bromine or iodine atom with fluorine is preceded by addition of fluorine to all unsaturated carbon-carbon bonds in the unsaturated halocarbon molecule.

The reaction product may be treated in any convenient manner to recover therefrom the desired fluorination product. One convenient way in the case of vapor phase fluorination consists in cooling and condensing the effluent vapors and treating the condensed liquid to separate therefrom the fluorine-containing saturated halocarbon. Thus the condensed liquid may be fractionally distilled and the desired fraction collected, or it may be treated directly with water and, subsequently, with a dilute aqueous alkali to free it from elemental halogen and then fractionally distilled. In any event the desired fluorine-containing fraction may be collected and less highly fluorinated fractions may, if desired, be recycled to the fluorination reaction vessel to increase the proportion of fluorine in the fraction.

In the case of fluorination with the halocarbon reactant in the liquid state, the reaction mixture may be filtered or otherwise treated to separate the organic and inorganic constituents. The inorganic constituents, consisting mainly of spent cerium fluoride, may be dried, or washed with a low boiling organic liquid and dried, and then regenerated with elemental fluorine and recycled in the process. The organic constituents may be washed with water and with dilute aqueous alkali to free them from elemental halogen, and the mixture then fractionally distilled. Inert liquid diluents and insufficiently fluorinated organic substances collected during the distillation may be returned, either together or separately, to the fluorination vessel and the fluorine content of the insufficiently fluorinated portion increased by further treatment with fresh or regenerated cerium tetrafluoride. Other ways of recovering the desired fluorination product from the reaction mixture will be apparent to those familiar with the art and the present invention is not limited as to such methods of recovery.

Certain advantages of the invention are apparent from the following examples, which are included by way of illustration only and are not to be construed as limiting.

Example 1

One pound of cerous oxalate was dissolved in concentrated nitric acid, and sufficient aqueous hydrogen fluoride added to precipitate the cerium as cerium trifluoride. The precipitated cerium trifluoride was separated by decanting the supernatant liquid and the trifluoride washed several times with water. The washed product was dried, broken up into coarse granules and packed loosely into a tubular nickel reactor. Elemental fluorine was passed over the cerium trifluoride for three hours at 230° C. The temperature was then raised to 470° C. and the solid again treated with elemental fluorine for several hours. A large proportion of the cerium trifluoride was thus converted to cerium tetrafluoride and this product was utilized without removal from the fluorination reactor in the subsequent fluorination of saturated halocarbons.

Example 2

A reactor containing cerium tetrafluoride similar to that described in Example 1 is heated at about 300° C. and a slow stream of trichlorotrifluoropropene vapor passed slowly through the heated reactor. The vapors issuing from the reactor are cooled in a receiver and the condensed organic product collected is washed with dilute aqueous alkali and sulphuric acid. The washed product is fractionally distilled and there are thus obtained fractions consisting substantially of trichloropentafluoropropane, dichlorohexafluoropropane and monochloroheptafluoropropane.

In a manner similar to that just described dichlorotetrafluoropropene, tribromotrichloropropene, tribromotrifluoropropene, hexafluoropropene and monobromodichlorotrifluoropropene are fluorinated with cerium tetrafluoride with the production of saturated fluorine-containing halocarbons.

Example 3

The fluorination of trichlorotrifluoropropene is carried out substantially as in Example 2 except that the temperature of the reactor and contents is kept at about 400° C. A substantial proportion of perfluoropropane is contained in the reactor product.

Example 4

A reactor containing cerium tetrafluoride is heated at about 275° C. and a slow stream of tetrachloroethylene vapor is passed through the heated reactor. Effluent vapors from the reactor are cooled to condense organic constituents therein and the condensed liquid washed with dilute alkali and fractionally distilled. Among the products collected are tetrachlorodifluoroethane, trichlorotrifluoroethane, trichlorotrifluoroethane and dichlorotetrafluoroethane.

A determination similar to the one just described is carried out at a temperature of about 400° C. Substantial quantities of perfluoroethane are isolated from the reaction product.

Example 5

Two hundred sixty-one grams of hexachlorobutadiene was passed through a reactor similar to that described in Example 1 containing cerium tetrafluoride heated to 266° C. A period of two hours was required for this operation. After the addition of hexachlorobutadiene was complete the reactor was purged with nitrogen for three hours. Two hundred twenty-one grams of product was collected from which were isolated tetrachlorohexafluorobutane and pentachloropentafluorobutane.

Example 6

A reactor containing a substantial excess of cerium tetrafluoride is heated at a temperature of from 350° C. to 400° C. Hexachlorobenzene is heated in a vessel separate from the fluorination reactor at a temperature of about 275° C. and a slow stream of nitrogen passed through the vessel containing the heated hexachlorobenzene. The mixture of nitrogen and hexachlorobenzene vapors issuing from the vessel is passed directly into the fluorination reactor containing heated cerium tetrafluoride. Effluent vapors from the fluorination reactor are cooled in a receiver and the condensed product which collects in the receiver is washed with dilute aqueous alkali and water. Fractional distillation of the washed product yields a substantial fraction of trichlorononafluorocyclohexane.

Recirculation of the trichlorononafluorocyclohexane through the heated reactor containing cerium tetrafluoride yields a product containing a substantial proportion of perfluorocyclohexane.

We claim:

1. The method for the fluorination of an unsaturated halocarbon containing in the molecule at least one halogen other than fluorine to saturate, with fluorine, a double bond of the unsaturated halocarbon and to replace, with fluorine, at least one halogen atom other than fluorine in the unsaturated halocarbon, with retention of the carbon structure of the starting unsaturated halocarbon, the steps which include (1) vaporizing an unsaturated halocarbon containing at least one halogen atom other than fluorine, (2) maintaining cerium tetrafluoride in a reaction zone at a temperature between about 100 and about 500 degrees centigrade, (3) causing the unsaturated halocarbon and cerium tetrafluoride to react in the reaction zone at said temperature with saturation, with fluorine, of at least one double bond in the unsaturated halocarbon, and with replacement, with fluorine, of at least one halogen atom other than fluorine in the unsaturated halocarbon, (4) condensing from the effluent product a halocarbon having the carbon structure of the starting halocarbon wherein at least one double bond has been saturated with fluorine, and wherein at least one halogen atom other than fluorine has been replaced with fluorine.

2. The process of claim 1, wherein the starting halocarbon is tetrachloroethylene.

3. The process of claim 1, wherein the starting halocarbon is hexachlorobutadiene.

4. The process of claim 1, wherein the starting halocarbon is hexachlorobenzene.

EARL T. McBEE.
RICHARD M. ROBB.
WALDO B. LIGETT.

REFERENCES CITED

The following references are of record in the file of this patent:

UNITED STATES PATENTS

| Number | Name | Date |
| --- | --- | --- |
| 2,004,932 | Daudt et al. | June 18, 1935 |
| 2,013,035 | Daudt et al. | Sept. 3, 1935 |
| 2,024,008 | Midgley et al. | Dec. 10, 1935 |
| 2,062,743 | Daudt et al. | Dec. 1, 1936 |
| 2,192,143 | Midgley et al. | Feb. 27, 1940 |
| 2,220,713 | Groose et al. | Nov. 5, 1940 |
| 2,238,242 | Balon et al. | Apr. 15, 1941 |
| 2,423,045 | Passino et al. | June 24, 1947 |
| 2,426,172 | Benning | Aug. 26, 1947 |

FOREIGN PATENTS

| Number | Country | Date |
| --- | --- | --- |
| 214,293 | Great Britain | Apr. 14, 1924 |
| 429,591 | Great Britain | May 28, 1935 |
| 3141/31 | Australia | Jan. 20, 1933 |
| 786,123 | France | June 3, 1935 |

OTHER REFERENCES

Ruff and Ascher: "Z. Anorg. Allem. Chem.," vol. 183, pages 193–213 (1929).

Ruff and Giese: "Z. Anorg. Allgem. Chem.," vol. 219, pages 143–148 (1934).

Dimroth et al.: "Ber. Deut. Chem.," vol. 64, pages 516–522 (1931).

Henne et al., J. A. C. S., vol. 63, pp. 3478–3479 (1941).

Moissan: "Comptes Rendus," vol. 130, pp. 622–627 (1900).

Wartenberg: "Zeitschr. Anorg. Allgem. Chem.," vol. 244, pp. 337–347 (1940).

Henne et al.; J. A. C. S., vol. 67, pp. 1235–7 (1945).